United States Patent [19]

Bortins et al.

[11] Patent Number: 5,471,354
[45] Date of Patent: * Nov. 28, 1995

[54] SERVO HEAD WITH CLOSE SERVO TRANSDUCER PLACEMENT FOR IMPROVED PASSIVE NOISE CANCELLATION

[75] Inventors: John Bortins, Bloomington; Frank Stageberg, Edina; Lance E. Stover, Chaska; Gerald L. Weispfenning, St. Paul, all of Minn.

[73] Assignee: Seagate Technology, Inc., Scotts Valley, Calif.

[ * ] Notice: The portion of the term of this patent subsequent to May 11, 2010, has been disclaimed.

[21] Appl. No.: 248,756

[22] Filed: May 25, 1994

Related U.S. Application Data

[63] Continuation of Ser. No. 935,056, Aug. 24, 1992, abandoned, which is a continuation-in-part of Ser. No. 573,878, Aug. 27, 1990, Pat. No. 5,210,669.

[51] Int. Cl.$^6$ .................................................... G11B 5/17
[52] U.S. Cl. ................................... 360/77.05; 360/124
[58] Field of Search ................................... 360/124, 121, 360/77.02, 77.05

[56] References Cited

U.S. PATENT DOCUMENTS

| | | | |
|---|---|---|---|
| 3,582,918 | 6/1971 | Tiemann | 360/67 |
| 4,008,493 | 2/1977 | Pizzuto | 360/124 |
| 4,012,782 | 3/1977 | Lazzari et al. | 360/123 |
| 4,072,944 | 2/1978 | Takashima | 360/124 |
| 4,823,205 | 4/1989 | Hannon et al. | 360/77.03 X |
| 4,962,437 | 10/1990 | Wilcox | 360/103 |
| 5,210,669 | 5/1993 | Weispfenning et al. | 360/124 |

FOREIGN PATENT DOCUMENTS

| | | |
|---|---|---|
| 0108386 | 5/1984 | European Pat. Off. . |
| 62-285214 | 11/1987 | Japan . |
| 1-211207 | 8/1989 | Japan . |

OTHER PUBLICATIONS

J. Desserre et al., "New Possibilities offered by integrated heads to reduce crossfeed (write to read)", IEEE Transactions On Magnetics, vol. MAG–13, No. 5, Sep. 1977, pp. 1469–1471.

Primary Examiner—Aristotelis Psitos
Assistant Examiner—James T. Wilson
Attorney, Agent, or Firm—Kinney & Lange

[57] ABSTRACT

A servo head in a disk file data storage system includes two servo transducers which are connected so that noise induced by a nearby writing data head cancels. The first servo transducer, mounted on a slider, reads information stored on a servo disk. A second servo transducer, also located on the slider, is connected to the first servo transducer to produce an output signal so that noise signals induced in the first servo transducer by operation of the data transducer tend to be canceled by noise signals induced in the second servo transducer by operation of the data transducer. The two servo transducers are located such that they are closely spaced relative to the size of the servo transducers. The close proximity of the two servo transducers reduces the effect of unequal shielding from noise signals induced in the two servo transducers by the data head.

22 Claims, 14 Drawing Sheets

SERVO HEAD WITH CLOSE SERVO TRANSDUCER PLACEMENT FOR IMPROVED PASSIVE NOISE CANCELLATION

This is a continuation of application Ser. No. 07/935,056, filed Aug. 24, 1992, now abandoned which is a continuation-in-part of application Ser. No. 07/573,878, filed Aug. 27, 1990, now U.S. Pat. No. 5,210,669.

BACKGROUND OF THE INVENTION

This invention relates to servo heads in disk file data storage systems. In particular, the present invention relates to improved passive noise in the servo heads by the use of multiple servo transducers.

Disk file data storage systems contain magnetic media disks on which data is stored in concentric tracks by means of data heads which write and read magnetically encoded data. These data heads are mechanically linked to a servo head located on an electromechanical actuator. The servo head and the actuator are part of a negative feedback, closed loop servo system which is used to move the data heads (and the servo head) from one track to another for track seek operations and to hold then directly over a track for track following.

The normal output signal of the servo head is encoded radial position information, which it reads from the servo disk. However, the servo head is also susceptible to picking up external electromagnetic radiation. The main source of this external electromagnetic radiation is the data head located across from the servo head. When that data head writing data, it is also radiating noise to the servo head. The noise corrupts the normal radial position information for the servo system, thus, reducing the track following precision. Consequently, the data written at that time may not be completely within the actual data track boundaries. Later, when this data is being read, the normal track following precision has returned. However, the data head is then flying within the track boundaries trying to read data which may not be written completely within the track boundaries. This increases the probability that data errors will occur during reading.

A passive noise cancellation technique for servo heads is described in a commonly-assigned patent entitled Thin Film Servo Head Employing The Inactive Transducer Coils To Cancel Write Noise From Nearby Data Heads by L. A. Wilcox, U.S. Pat. No. 4,962,437, issued Oct. 9, 1990, and which is hereby incorporated by reference. In this patent, the servo head includes two servo transducers. The first servo transducer reads the servo information stored on the servo disk. The second servo transducer is located on the same slider as the first servo transducer, but has its pole tips recessed slightly from the servo disk surface to prevent it from reading a signal from the servo disk. The second servo transducer is connected to the first servo transducer with opposite coil polarity in either a series-opposing or parallel-opposing configuration. The noise induced in the second servo transducer (which is generated by the adjacent data head when it is writing data) tends to cancel similar noise which is induced in the first servo transducer. Therefore, during normal operation, the net output voltage of this combined servo head, even in the presence of noise, more closely approximates the signal read from the servo disk by the first servo transducer.

An impediment to the effectiveness of passive noise cancellation techniques for servo heads is the effect of unequal shielding of the two servo transducers from electromagnetic noise radiated by the data head. Although located on the same slider as the first servo transducer, the second servo transducer may be placed such that it receives either more or less shielding from data head noise than the first servo transducer. Common sources of unequal shielding are springs and bonded wires in the area of the servo head. It is difficult to adjust for the effects of unequal shielding from wires and springs because the placement of these elements is a non-reproducible effect which can change with each slider.

SUMMARY OF THE INVENTION

The present invention further improves passive noise cancellation in servo heads of a disk file storage system. The present invention is based upon a recognition of limitations in passive noise cancellation techniques which use two servo transducers. Because the second servo transducer is frequently more or less shielded from electromagnetic noise radiated from the data head, lower or higher amplitude noise may be induced in the second servo transducer, relative to the first servo transducer. This results in incomplete cancellation of noise in the servo output signal.

The present invention increases track following precision and accuracy of the servo system by changing the placement of the second servo transducer. The present invention utilizes a servo head, positioned between a data disk and a servo disk, and adjacent to the servo disk. The servo head produces a servo output signal as a function of the servo information. The servo head includes a slider, a first servo transducer mounted on the slider for reading the servo information stored on the servo disk, and a second servo transducer also mounted on the slider. The first and second servo transducers are connected to produce the servo output signal so that noise signals induced in the first servo transducer by operation of the data transducer tend to be canceled by noise signals induced in the second servo transducer by operation of the data transducer. In order to further reduce incomplete noise cancellation, the first and second servo transducers are positioned substantially as close to one another as possible. In one preferred embodiment of the present invention, the proximity of the two servo transducers is close relative to the size of the transducers.

DETAILED DESCRIPTION OF THE PREFERRED EMBODIMENTS

Figure 1:
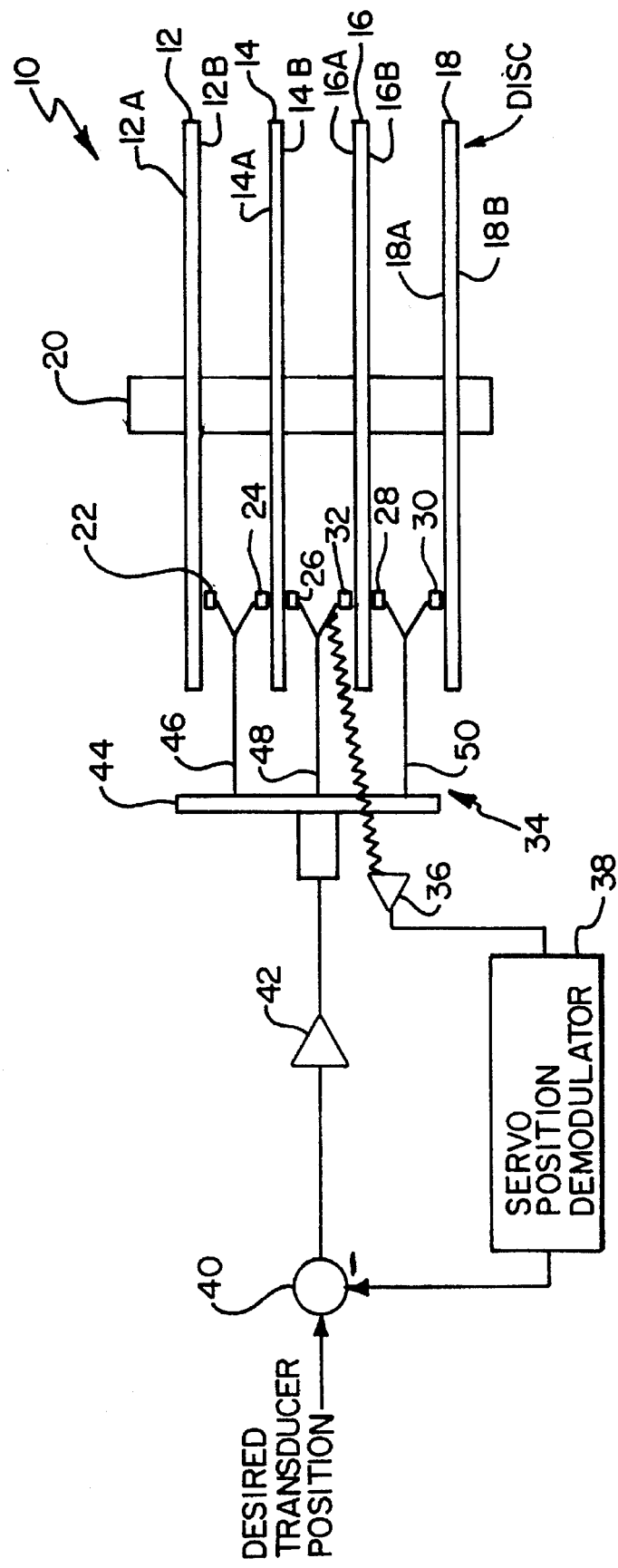
FIG. 1 is a block diagram of a servo system of a rotating disk data storage system.

FIG. 1 shows a disk file data storage system 10 which includes magnetic disks 12, 14, 16 and 18 which are mounted on spindle 20. In the embodiment shown in FIG. 1, data head 22 writes data to and reads data from lower surface 12b of disk 12. Data head 24 reads data from and writes data to upper surface 14a of disk 14, while data head 26 reads data from and writes data to lower surface 14b of disk 14. Data head 28 reads data from and writes data to lower surface 16b of disk 16, and data head 30 reads data from and writes data to the upper surface 18a of disk 18.

The positioning of data heads 22, 24, 26, 28 and 30 is controlled by a servo system which includes servo head 32, actuator 34, servo read amplifier 36, servo position demodulator 38, position error signal generator 40, and actuator driver 42. In this particular embodiment, actuator 34 includes an actuator spindle 44 and three actuator arm assemblies 46, 48, and 50. Data heads 22 and 24 are supported by flex arms at the distal end of actuator arm assembly 46. Data head 26 and servo head 32 are supported by flex arms at the distal end of actuator arm assembly 48. Data heads 28 and 30 are supported by flex arms at the distal end of actuator arm assembly 50.

Servo head 32 is positioned adjacent upper surface 16a of disk 16. This upper surface 16a acts as the servo disk surface, and has stored track information which is read by servo head 32 and supplied to servo read amplifier 36 and then to servo position demodulator 38. Servo position demodulator 38 produces an actual transducer position signal based upon information read by servo head 32. The actual transducer position signal is compared to a desired transducer position signal, and a position error signal is generated by position error signal generator 40. The position error signal is supplied through servo driver 42 to control operation of actuator 34. The servo system shown in FIG. 1 provides a negative feedback, closed loop control so that the data heads are moved generally in a radial direction with respect to disks 12, 14, 16 and 18 in order to move the data heads to a desired track during a track seek operation, and to hold the data heads over the desired track during a reading or writing operation.

In the preferred embodiments of the present invention, data heads 22, 24, 26, 28 and 30, and servo head 32 use thin film magnetic transducers. FIG. 2 shows a typical prior art servo head, which includes slider 60 and thin film transducer 62. The construction of the servo and data heads is generally similar.

Figure 2A:
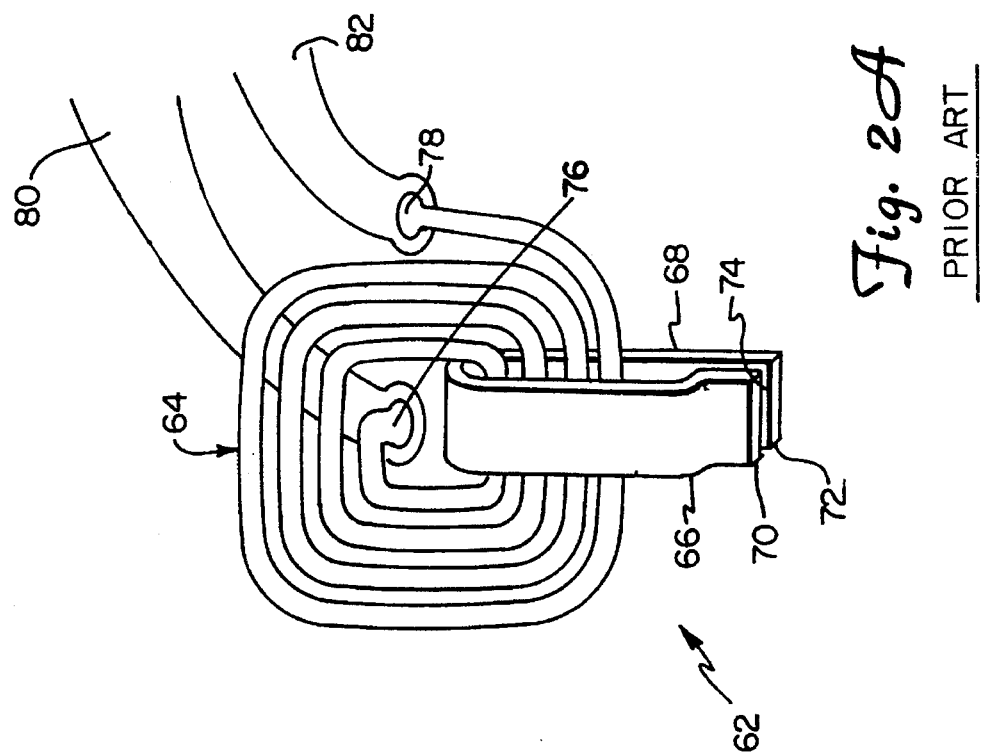
FIG. 2A is a diagrammatic view of a thin film transducer of the type shown in FIG. 2.
Figure 2:
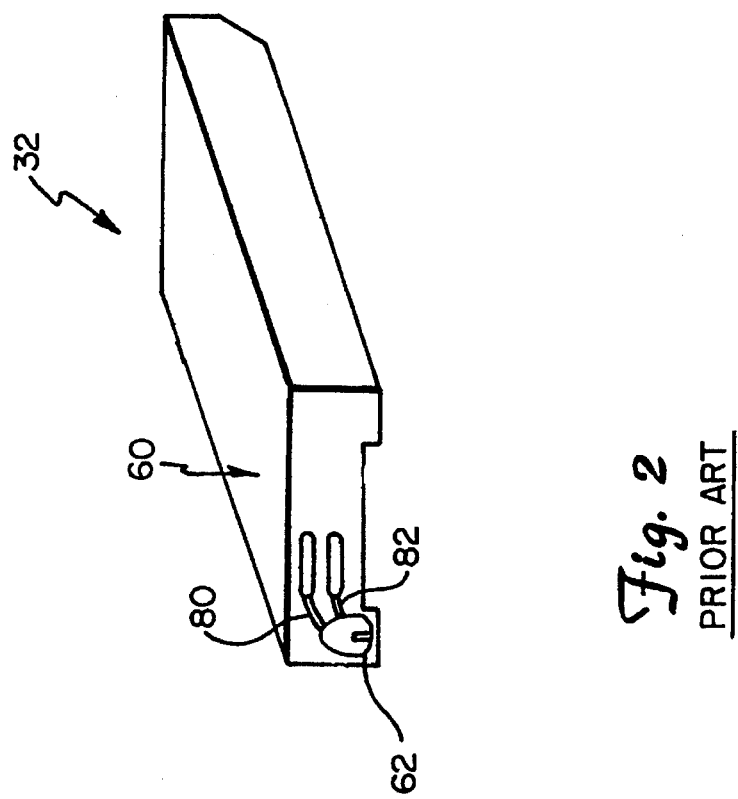
FIG. 2 is a perspective view of a typical servo or data head with a thin film magnetic transducer.

Transducer 62 is shown in further detail in FIG. 2A. Basically, transducer 62 includes a flat coiled conductor 64 and upper and lower pole pieces 66 and 68 which are formed in a U or horseshoe configuration. Upper and lower pole pieces 66 and 68 terminate in a pair of pole tips 70 and 72 with a gap 74 between them. Opposite ends 76 and 78 of coil conductor 64 are connected to transducer terminals 80 and 82, respectively. External leads can be connected to transducer terminals 80 and 82.

The pole pieces 66 and 68 loop through coil 64, and pole tips 70 and 72 are oriented toward the disk surface. As the disk spins, the pole tips concentrate the low level magnetic flux from the track into coil 64, thus generating an output voltage signal.

Figure 3:
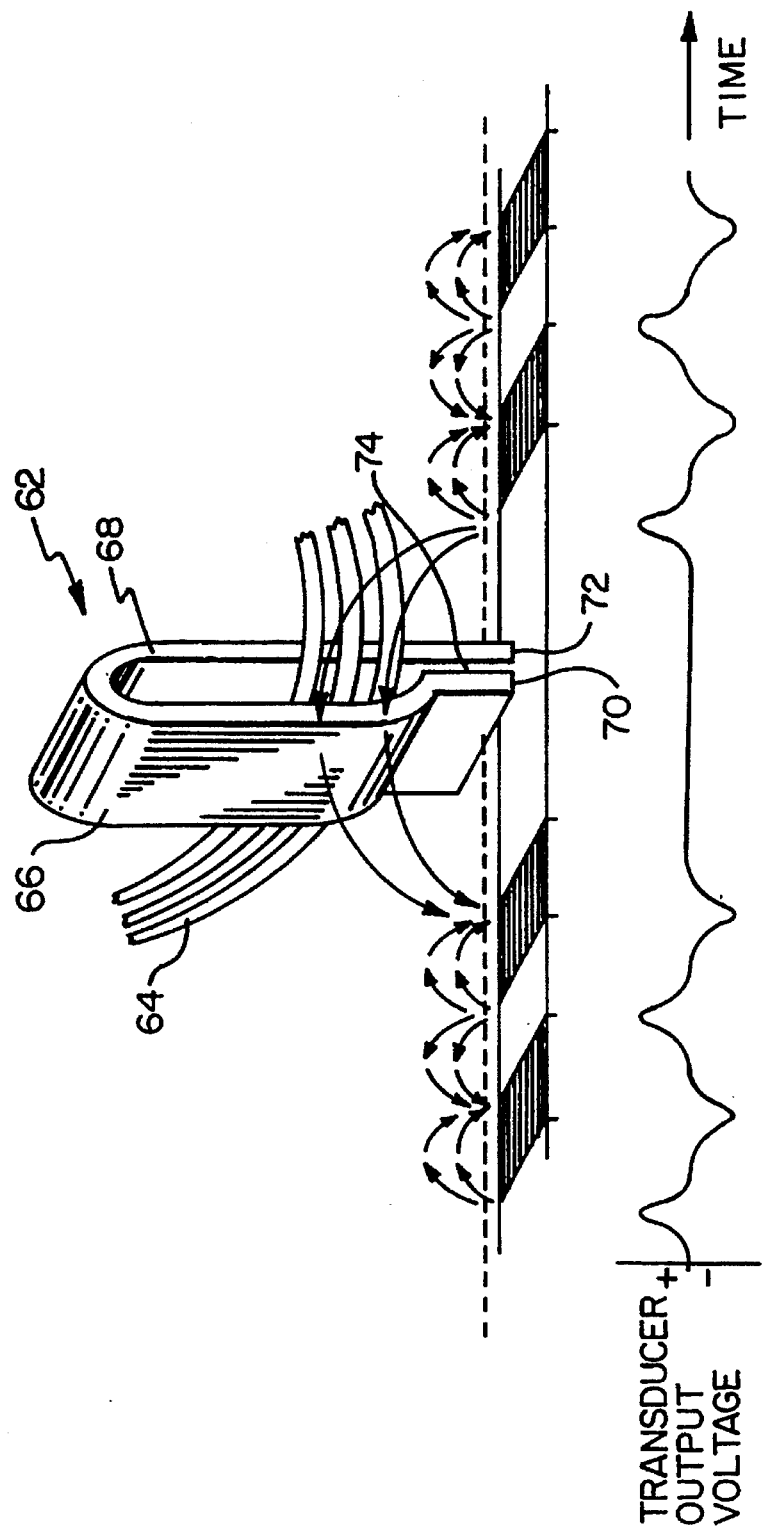
FIG. 3 is a diagram showing the relationship of the transducer to the track and to the transducer output signal.

FIG. 3 shows the operation of servo transducer 62 as a servo track on upper surface 16a of disk 16 moves relative to transducer 62. In FIG. 3, the transducer output voltage, which is derived from transducer terminals 80 and 82, is shown as a function of time as the servo track moves past pole tips 70 and 72.

Figure 4:
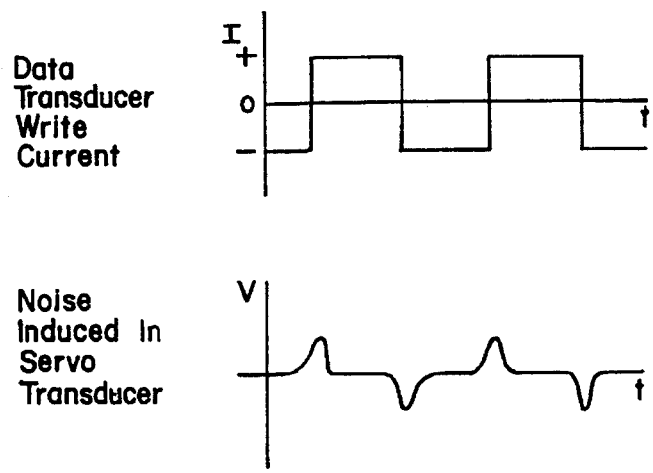
FIG. 4 is a diagram showing wave forms of data transducer write current and noise induced in a servo transducer as a function of time to show the relationship of data transducer write current to noise induced in the servo transducer.
Figure 5:
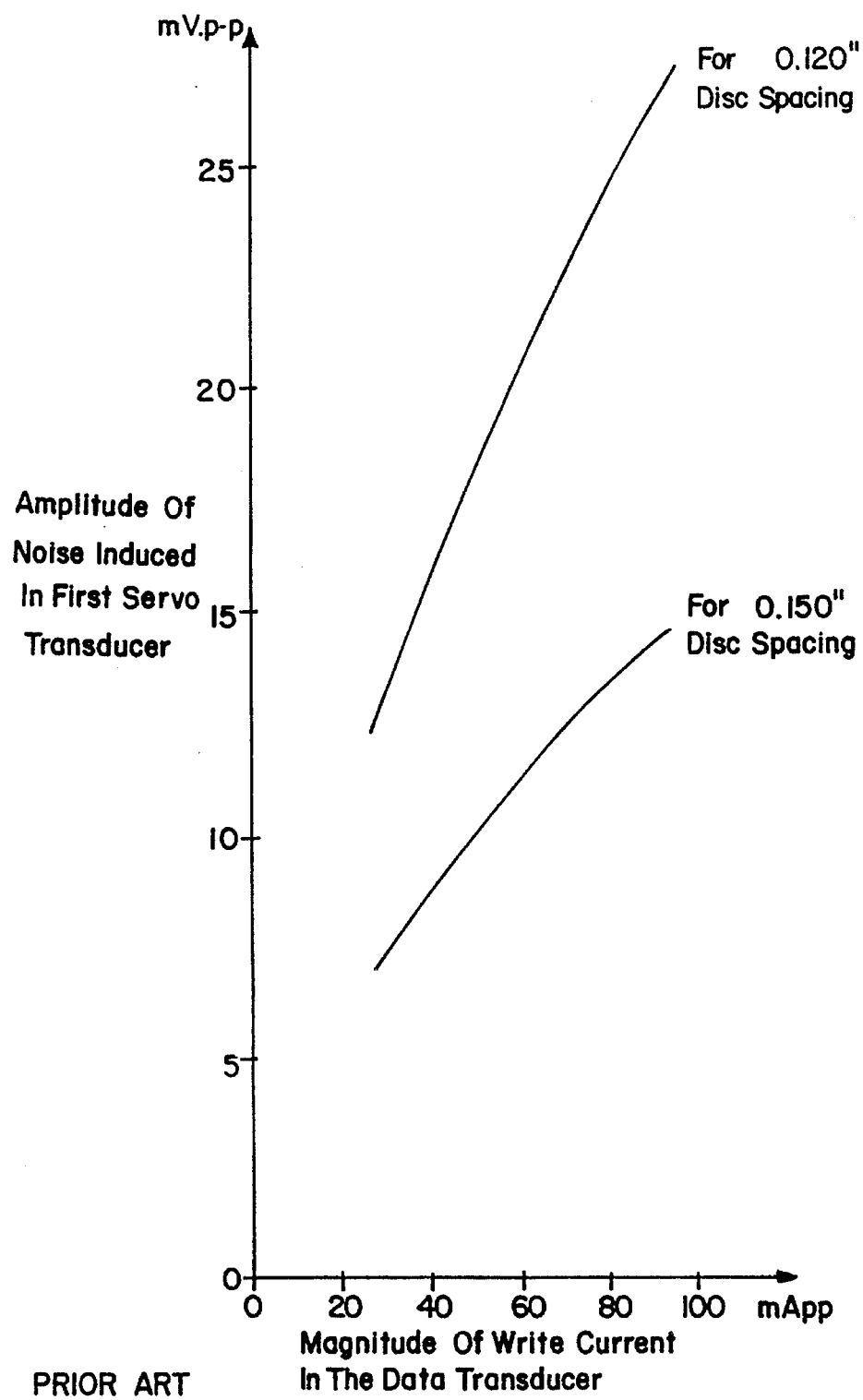
FIG. 5 is a graph showing amplitude of noise induced in a first servo transducer as function of magnitude of write current in the data transducer for two different disk spacings.

The primary source of undesired electromagnetic radiation to the servo transducer 62 of servo head 32 is the data head 26 which shares the same actuator arm assembly 48 with servo head 32. As shown in FIG. 1, data head 26 and servo head 32 are both located between disks 14 and 16, with data head 26 adjacent lower surface 14b of disk 14, and servo head 32 adjacent upper surface 16a of disk 16. The undesired electromagnetic radiation to servo head 32 occurs when data head 26 is writing data. As illustrated in FIG. 4, noise is induced in servo transducer 62 of servo head 32 with each transition in the data transducer write current. The amplitude of the noise induced in servo transducer 62 is proportional to the magnitude of the write current in data head 26, and also is related to the distance between the servo transducer 62 in servo head 32 and the data transducer in data head 26. These effects are illustrated in FIG. 5. The further the servo transducer is located from the data transducer, the lower the amplitude of the noise induced for a given write current.

Figure 6:
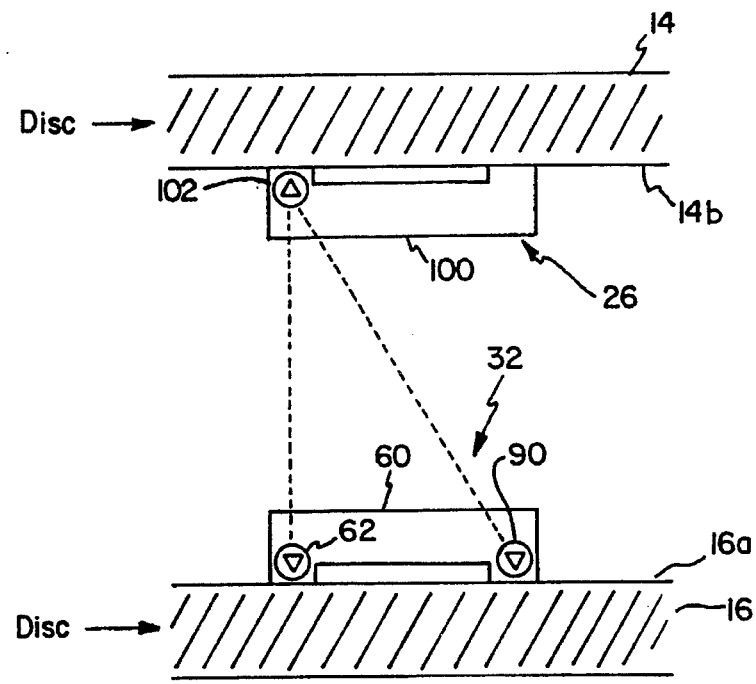
FIG. 6 shows a diagram of a servo head having passive noise cancellation, but without the improvement of the present invention.
Figure 7B:
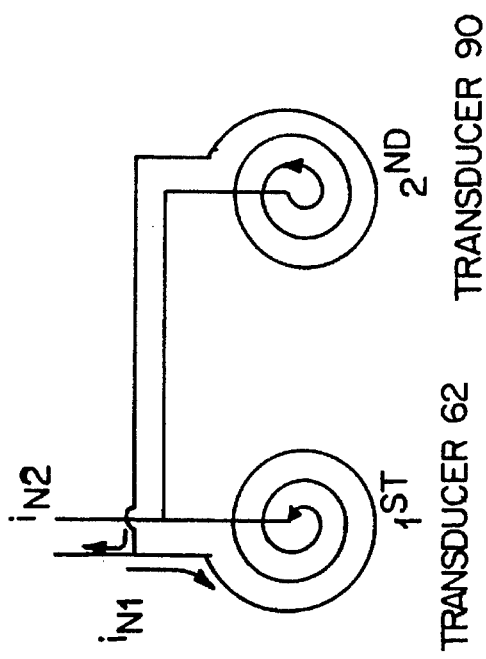
FIG. 7B shows first and second servo transducers connected in a parallel opposing configuration.
Figure 7A:
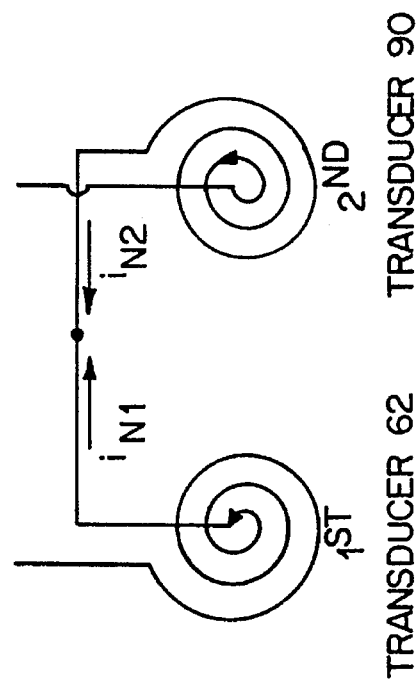
FIG. 7A shows the connection of first and second servo transducers in a series opposing configuration.

FIG. 6 illustrates a passive noise cancellation technique which is described in further detail in the previously mentioned U.S. Pat. No. 4,962,437. In this embodiment, servo transducer 32 includes first servo transducer 62 and a similar second servo transducer (or "inactive transducer") 90. Second servo transducer 90 is located on slider 60, but has its pole tips recessed slightly from surface 16a of disk 16. Second servo transducer 90 is connected to first servo transducer 60, but with opposite coil polarity in either a series opposing configuration as shown in FIG. 7A or a parallel opposing configuration as shown in FIG. 7B. In either case, the noise currents $i_{N1}$ and $i_{N2}$ induced by a write operation of data head 26 tend to cancel one another. Therefore, during normal operation, the net output voltage of the combined servo transducers 62 and 90, even in the presence of noise, more precisely reflects the signal read from the servo surface 16a of disk 16 than with a similar signal derived solely from first servo transducer 62.

As shown in FIG. 6, data head 26 includes a slider 100 and thin film magnetic data transducer 102. The construction and positioning of data transducer 102 is similar to the construction and positioning of first servo transducer 62. As shown in FIG. 6, first servo transducer 62 and data transducer 102 are generally aligned with one another and are closer to one another than are second servo transducer 90 and data transducer 102.

The noise cancellation by the use of first and second servo transducers 62 and 90 is directed specifically to noise induced by the write operation of data transducer 102 of data head 26. Disk 12, 14, 16 and 18 are typically metal disks and, as a result, servo transducer 62 is effectively shielded from all of the other data heads 22, 24, 28 and 30 by a metallic disk. That is not the case, however, with data head 26 which, like servo head 32, is positioned between disks 14 and 16.

Figure 8:
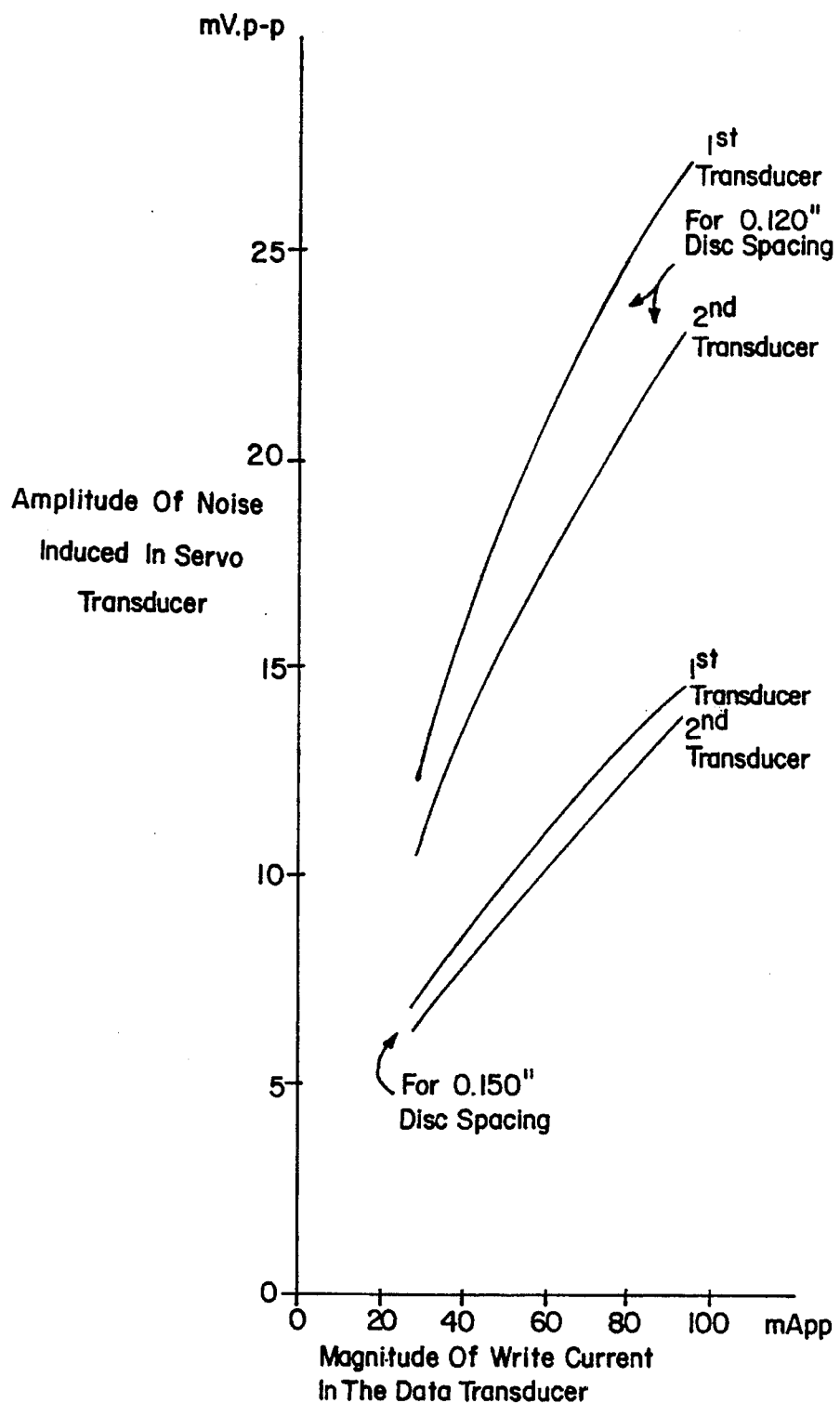
FIG. 8 is a graph showing amplitude of noise induced in a servo transducer as a function of magnitude of write current showing the effect of disk spacing on the amplitude of noise induced in the first and second servo transducers of the servo head shown in FIG. 6.

Although the passive noise cancellation provided by the structure shown in FIG. 6 represents an improvement over the use of only a single servo transducer, there are limitations to the effectiveness of the passive noise cancellation technique. First, the arrangement of servo transducers 62 and 90 as shown in FIG. 6 does not take into account the difference in distances between first and second servo transducers 62 and 90 and data transducer 102. Although the difference is small, it is enough to cause up to 20% difference in the amplitude of the noise induced in servo transducers 62 and 90. Because second servo transducer 90 is further from data transducer 102, lower amplitude noise is induced in second servo transducer 90. This is illustrated in FIG. 8. For disk spacing of 0.150 inches, there is a noticeable difference in the amplitude of the noise induced in the first and second servo transducers. For disk spacing of 0.120 inches, the difference between the amplitude of noise induced in the first and second servo transducers becomes more pronounced, and the difference increases as the magnitude of write current increases. Incomplete cancellation of noise from the servo read output signal affects the precision of the servo system during track following.

Figure 9:
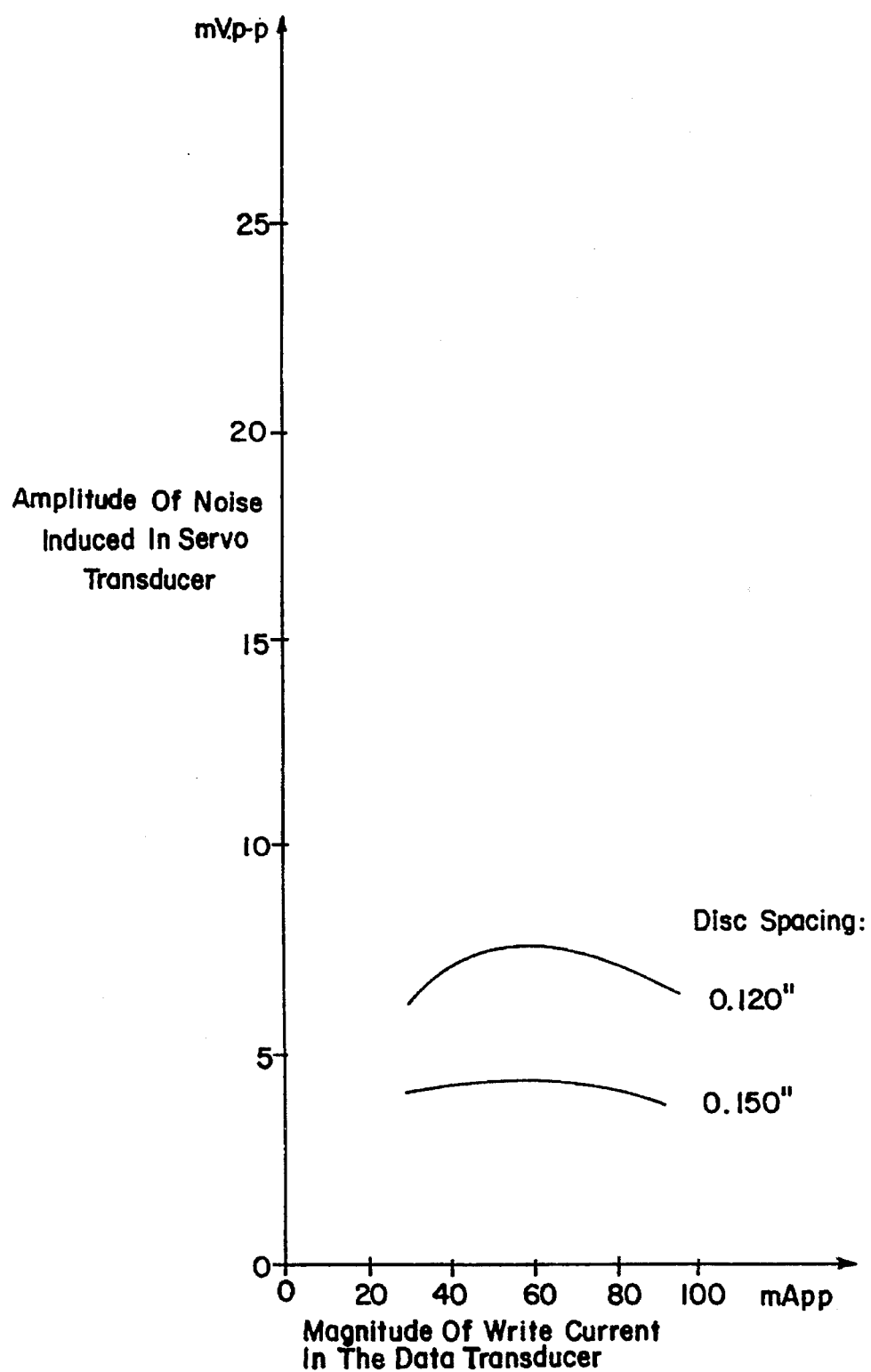
FIG. 9 is a graph of amplitude of noise induced in a servo transducer as a function of the magnitude of write current in the data transducer showing the effect of disk separation on the amplitude of noise induced in series opposing connected servo transducers.
Figure 10:
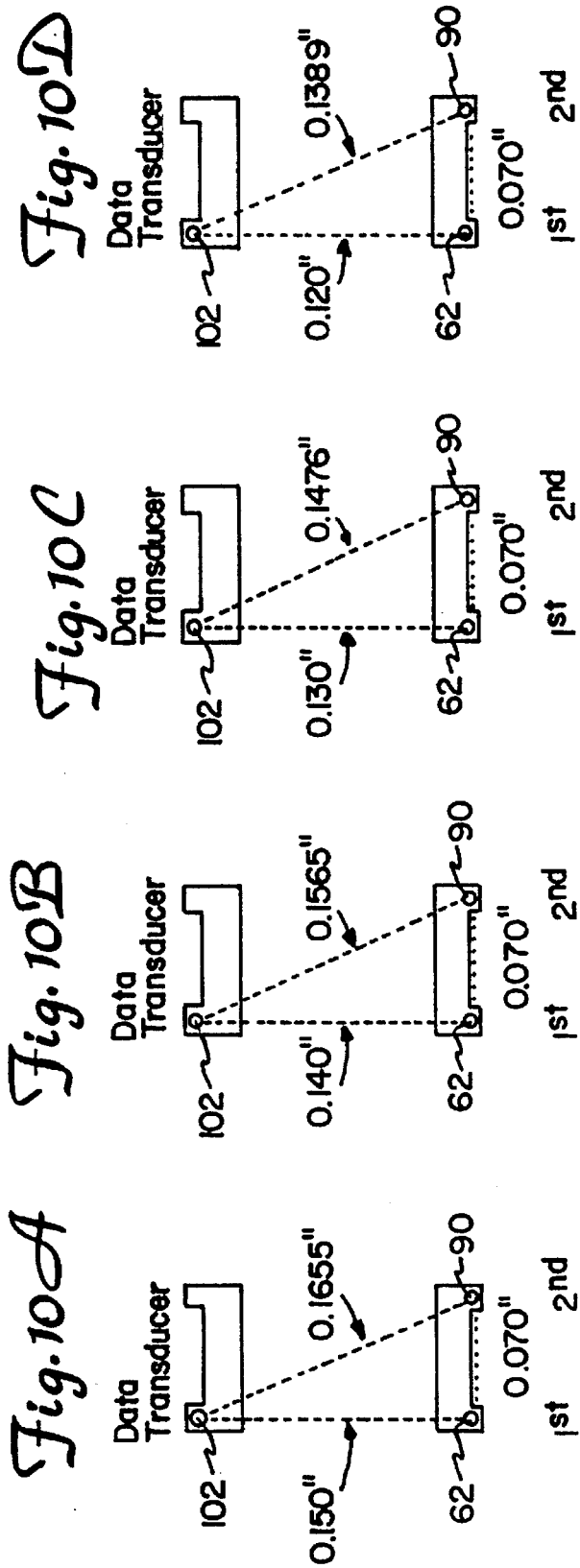
FIGS. 10A–10D illustrate the effect of disk separation on the distance of the first and second servo transducers from the data transducer.

FIG. 9 shows the effect of disk separation on the amplitude of noise induced when servo transducers 62 and 90 are connected in series opposing arrangement. From FIG. 9, it can be seen that net amplitude of noise induced becomes more pronounced as spacing between the disks is reduced.

FIG. 10A–10D illustrate the effect of disk separation on the distances of the first and second servo transducers 62 and 90 from data transducer 102. In each FIG. 10A–10D, the spacing between first and second servo transducer 62 and 90 is unchanged (0.070 inches) while the distance from first servo transducer 62 to data transducer 102 is reduced from 0.150 inches in FIG. 10A, to 0.140 inches in FIG. 10B, to 0.130 inches in FIG. 10C, to 0.120 inches in FIG. 10D. It can be seen that the difference between the distances becomes more pronounced as the distance between first servo transducer 62 and data transducer 102 is decreased.

Figure 11:
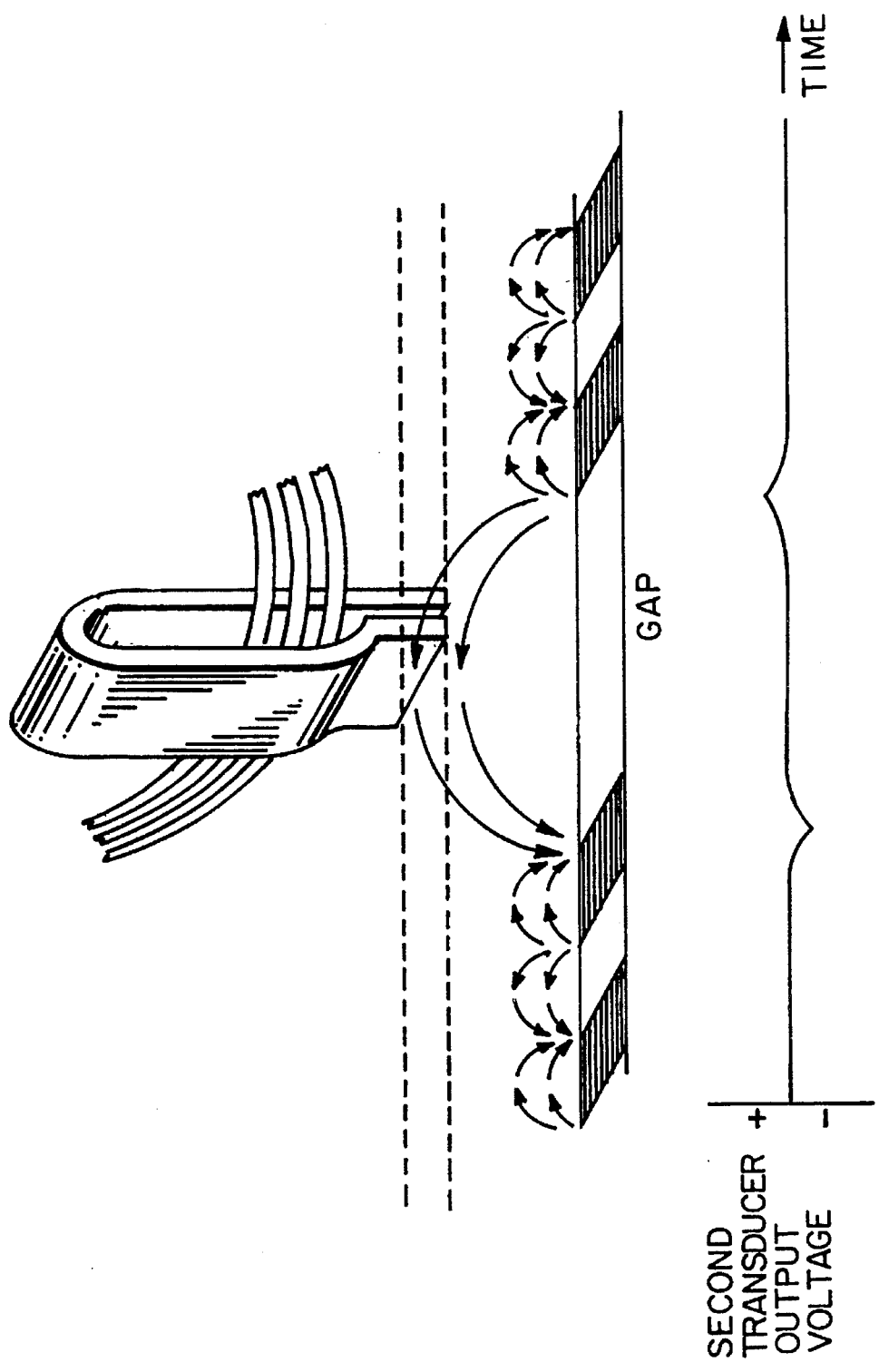
FIG. 11 is a diagram showing the relationship of the second servo transducer to the track and the second transducer output signal at the edges of gaps.

The second deficiency in the prior passive noise cancellation technique is that the second servo transducer 90, even though it is recessed slightly from the surface of disk 16, is still close enough to the surface so that it can read a signal from certain types of servo track patterns. This effect is illustrated in FIG. 11. In particular, second servo transducer 90 can read a signal from the edges of gap fields which are found in sectored servo tracks. Examples of gap fields are Index fields (that are blank in every sector but one per revolution) and Track ID fields (that are essentially blank for certain digital track ID codes). These are longer wavelength structures than the normal servo pattern. In general, the signal amplitude from a transducer is a function of not only the space or distance between the transducer and disk, but also the wavelength of the magnetic pattern. This relationship is described in the following approximate formula for spacing loss, in dB:

$$\text{Spacing Loss} = (-55 \text{ db}) \frac{d}{\lambda}$$

where d is the distance between the transducer pole tips and the disk surface, and X is the wavelength of the pattern. Thus, for a given distance, d, a longer wavelength structure, such as a gap field, has less signal loss. The distance, d, used in the prior passive noise cancellation technique is not large enough to eliminate the read signal from the gap fields. As illustrated in FIG. 11, the flux from a gap induces a low amplitude read signal in second servo transducer 90. The second read signal corrupts the normal servo read signal generated in first servo transducer 62, and decreases the accuracy of the position information used by the servo control system.

Figure 12:
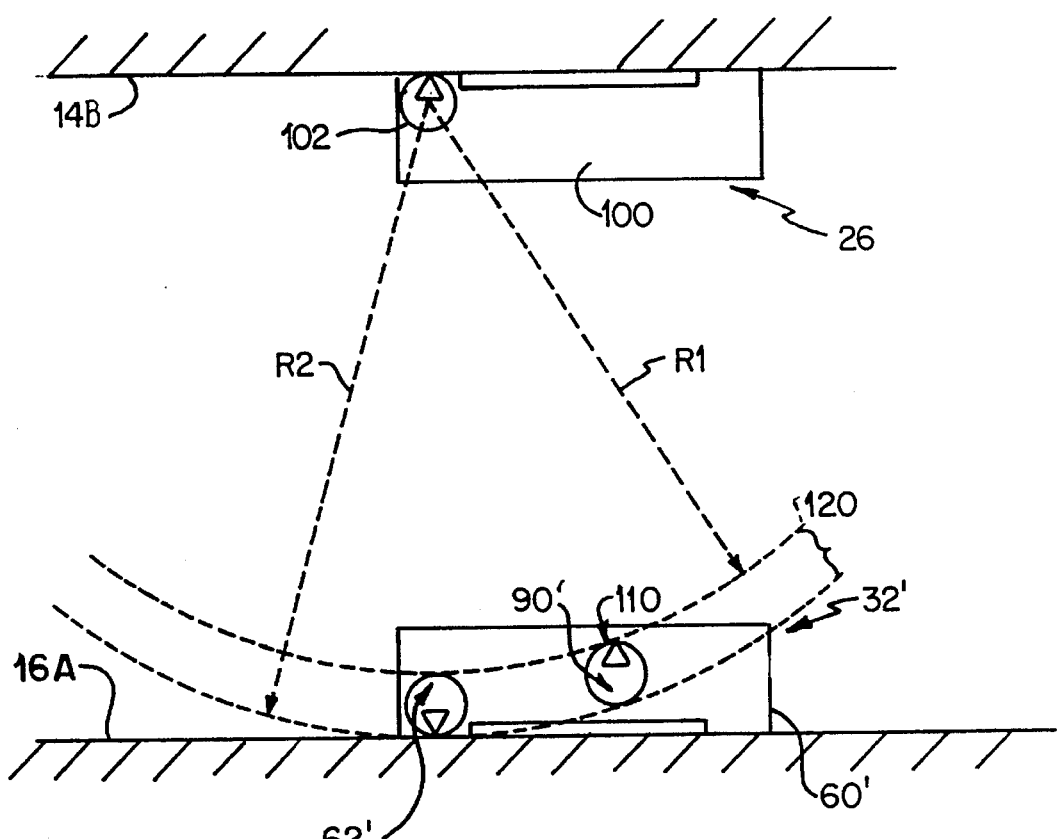
FIG. 12 is a diagram showing the placement and orientation of the first and second servo transducer for use with a single disk spacing distance.

FIG. 12 illustrates a first preferred embodiment of the invention set out in U.S. patent application Ser. No. 07/583,878, filed Aug. 27, 1990, now U.S. Pat. No. 5,210,669. In FIG. 12, servo head 32' includes a servo slider 60' first servo transducer 62', and second servo transducer 90'. Servo head 32' achieves an increase in track following precision by improved passive noise cancellation. In this embodiment, second servo transducer 90' is fabricated on servo slider 60' in a position such that first servo transducer 62' and second servo transducer 90' are an equal distance from data transducer 102 of data head 26. In addition, the pole tips 110 of second servo transducer 90' are oriented away from disk surface 16a to more effectively prevent second servo transducer 90' from reading a signal from disk 16.

When servo transducers 62' and 90' are connected with opposing polarity (as discussed previously), the output noise is completely canceled only if the amplitude of the noise induced in each separate transducer is equal. The amplitude of noise induced in servo transducers 62' and 90' is a function of the distances of those transducers from data transducer 102. For increased noise cancellation, therefore, servo transducers 62' and 90' are located at an equal distance from data transducer 102.

The distance between first servo transducer 62' and data transducer 102 is determined by the disk spacing between disks 14 and 16. Second servo transducer 90' is located in a circular zone of equidistance 120 which is drawn around the center of data transducer 102. This zone of equidistance is defined by first radius R1 which extends from the center of data transducer 102 to the uppermost portion of first servo transducer 62', and a second radius R2 which extends from the center of data transducer 102 to the lower most portion of first servo transducer 62'. As shown in FIG. 12, this zone of equidistance shows the zone on servo slider 60' where second servo transducer 90' can be positioned in accordance with the invention set out in U.S. Pat. No. 5,210,669.

Figure 13:
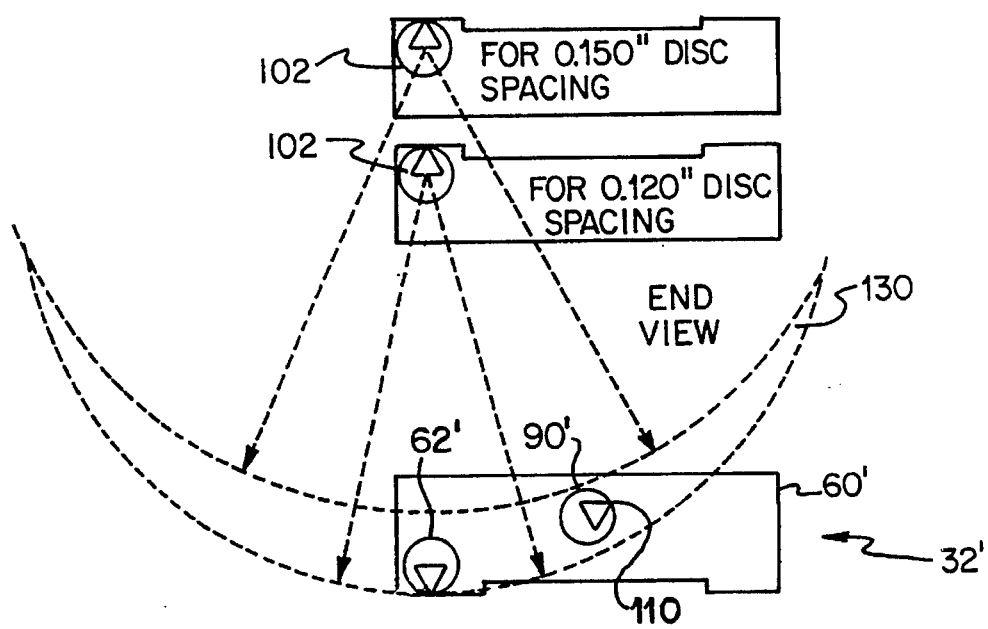
FIG. 13 is a diagram showing two different disk spacings and the placement and orientation of the first and second servo transducers to accommodate both disk spacing distances.

The location of the zone of equidistance 120 is a function of disk spacing. The sensitivity to disk spacing, however, can be decreased by placing second servo transducer 90' as close as possible to first servo transducer 62'. FIG. 13 shows the intersection of two zones of equidistance for two typical disk spacings (0.150 inches and 0.120 inches). The area of intersection 130 is widest near first servo transducer 62'.

Other constraints (such as the position of transducer output terminals on slider 60') can effect the exact position of second servo transducer 90' within the zone of equidistance 120 shown in FIG. 12, or the intersection of two zones of equidistance 130 as shown in FIG. 13.

Another important feature of the invention set out in U.S. Pat. No. 5,210,669 is that pole tips 110 of second servo transducer 90' are oriented generally away from the servo disk surface 16a. Second servo transducer 90' is essentially identical in construction to first servo transducer 62', so that they both have essentially the same inductance, resistance, and physical size. The amplitude of noise induced in both transducers 62' and 90' by a given electromagnetic field, therefore, should be equal. However, the orientation of pole tips 110 of second servo transducer 90' prevents second servo transducer 90' from reading an unwanted signal from servo disk surface 16a.

A common impediment to the effectiveness of passive noise cancellation techniques for servo heads as described above is the effect of unequal shielding of the two servo transducers from electromagnetic noise radiated by the data head. Referring to FIG. 6, although located on the same servo slider 60 as the first (or active) servo transducer 62, the second (or passive) servo transducer 90 may be placed such that it receives either more or less shielding, relative to the shielding received by first servo transducer 62, from noise generated by data head 26. Differences in shielding can be caused by a variety of things, including springs and bonded wires in the area of the servo head. Those differences are often non-repeatable differences and are, therefore, difficult to correct. The arrangement of servo transducers 62 and 90 as shown in FIG. 6 does not take into account the difference in shielding between first and second servo transducers 62 and 90 and data transducer 102. Because noise sensed by first servo transducer 62 may not be equal to noise sensed by second servo transducer 90, incomplete cancellation of noise from the servo read output signal will affect the precision of the servo system during track following operations.

Figure 14:
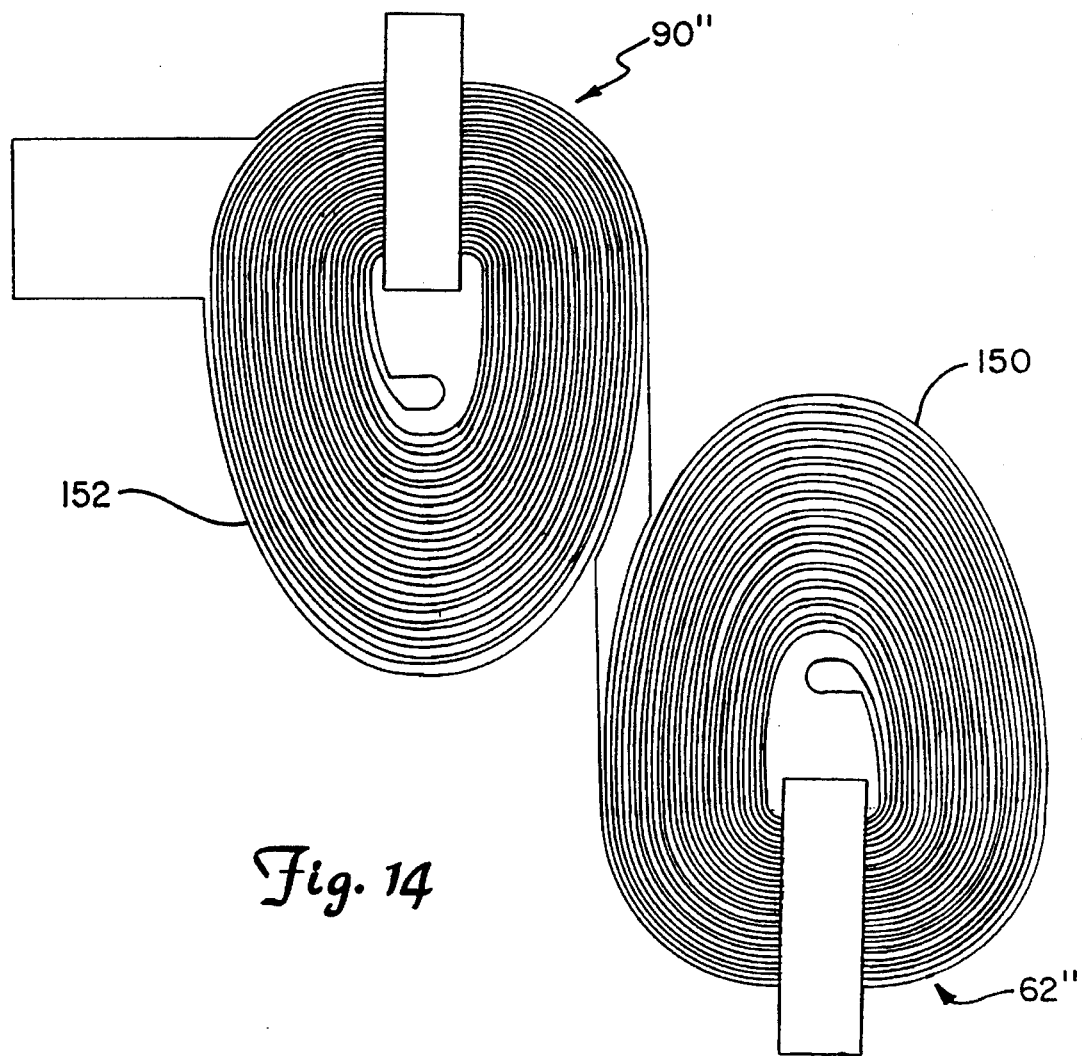
FIG. 14 shows first and second servo transducers connected and positioned adjacent one another, according to the present invention, to improve noise cancellation by reducing the possibility of unequal shielding.

FIG. 14 illustrates a preferred embodiment of the present invention which reduces the effects of unequal shielding. FIG. 14 is a side view of conducting coil 150 of the first servo transducer 62" and conducting coil 152 of the second servo transducer 90". This allows the coils of transducers 62" and 90" to be coplanar with one another as shown in FIG. 14. Servo transducer coils 150 and 152 are fabricated closely adjacent one another and are non-coaxial, being wound about axes perpendicular to the plane of FIG. 14 that are offset from each other. Moreover, coils 150 of servo transducer 62" do not overlap coils 152 of servo transducer 90". The two servo transducers 62" and 90" are once again connected in either a series-opposing connection or in a parallel-opposing connection.

Figure 15:
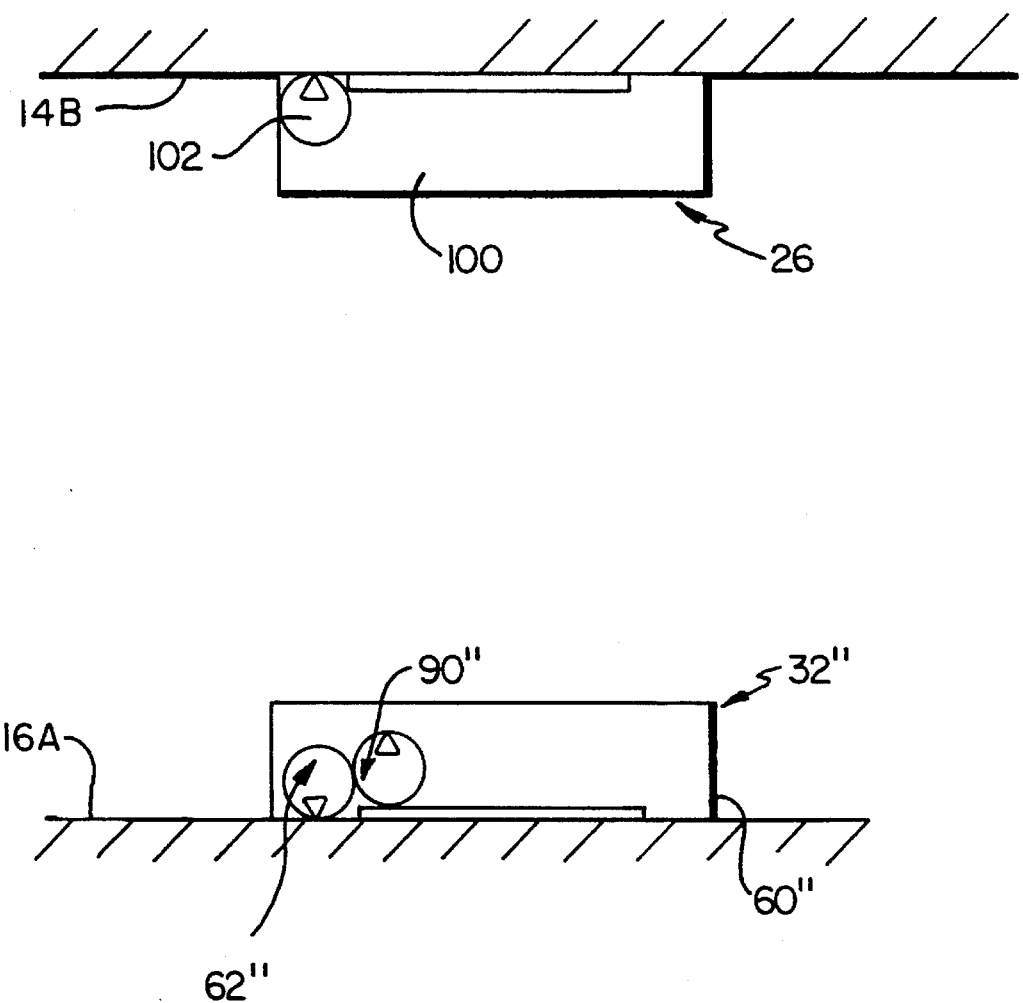
FIG. 15 is a diagram showing the close placement of the first and second servo transducers, in accordance with the present invention, to reduce the effects of unequal shielding on the noise cancellation technique.

FIG. 15 further illustrates the preferred embodiment shown in FIG. 14. FIG. 15 shows second servo transducer 90" placed immediately adjacent to first servo transducer 62" on servo slider 60". The spacing between the first and second servo transducers is close relative to the size of the transducers. The close spacing between first servo transducer 62" and second servo transducer 90" allows noise originating from data head 26, and sensed by first servo transducer 62" to be approximately equal to data head noise sensed by second servo transducer 90". Because first servo transducer 62" and second servo transducer 90" are connected with opposing polarity, the output noise is more completely canceled since the amplitude of the noise induced in each separate servo transducer is approximately equal.

Figure 16:
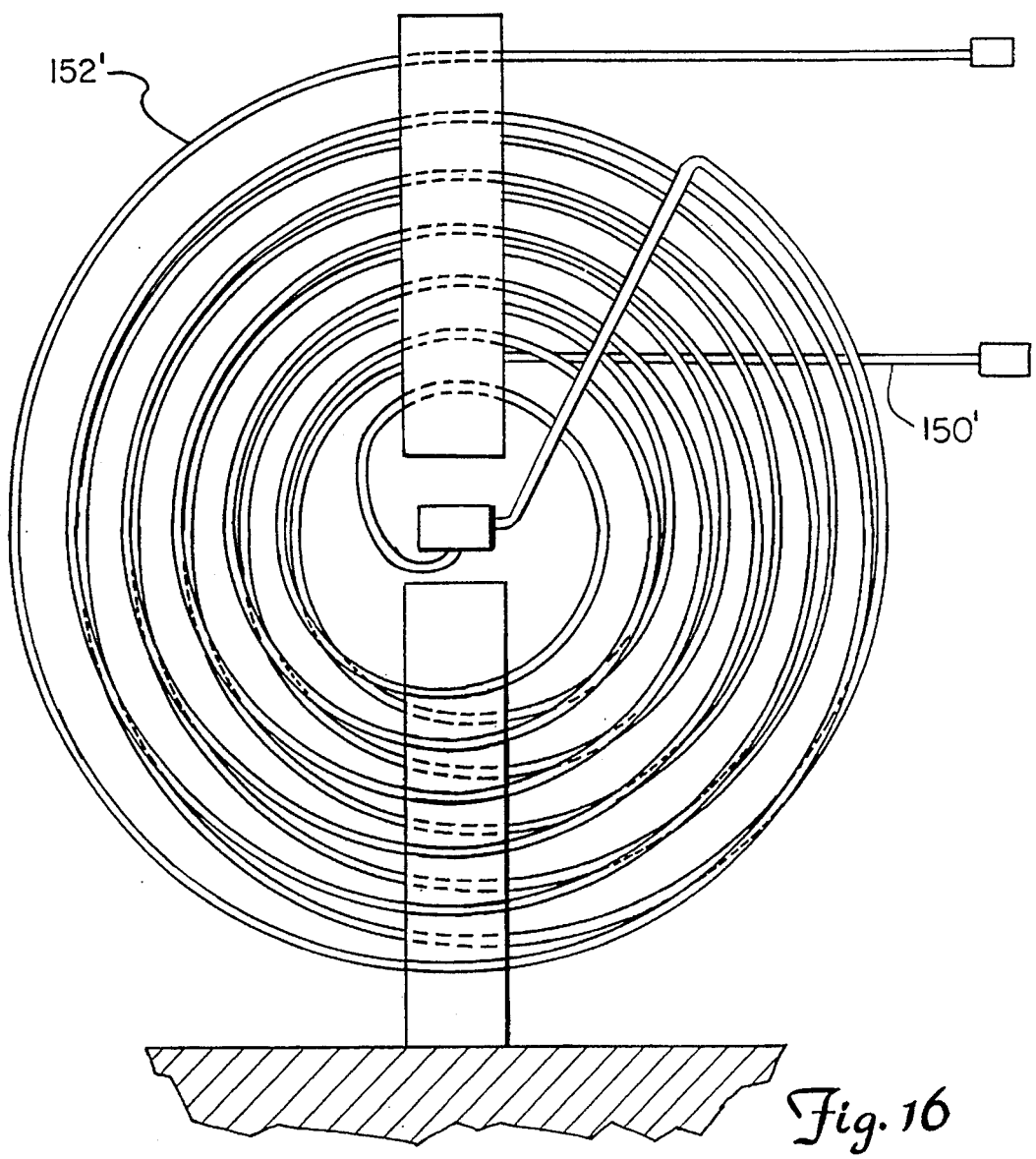
FIG. 16 is a diagram showing one preferred embodiment of the present invention in which the two servo transducer coils are fabricated substantially one on top of the other.
Figure 17:
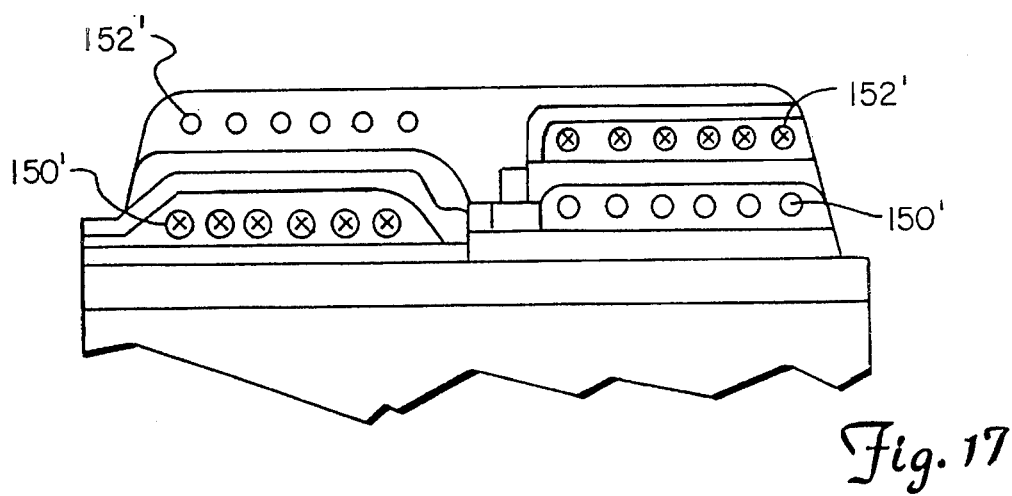
FIG. 17 is a sectional view of the servo transducer coils of FIG. 16 fabricated substantially one on top of the other.

FIG. 16 illustrates another preferred embodiment of the present invention. In FIG. 16, servo transducer coils 150' and 152' are shown fabricated substantially one on top of the other. In this preferred embodiment, the fabrication process steps are the same for each servo transducer, but are just repeated to achieve the fabrication of one servo transducer on top of the other. FIG. 17 is a sectional side view of the transducer coils 150' and 152' fabricated one on top of the other as shown in FIG. 16. The first servo transducer's coils 150' are shown to be wound opposite to the second servo transducer's coils 152'. This provides the opposite polarity needed to cancel noise from the servo read output signal. Other preferred embodiments include the first and second servo transducers being spaced substantially as close as possible to one another, being spaced close relative to the size of the servo slider, and having the close spacing limited by the size of the two servo transducers.

The improved noise cancellation provided by the embodiments of the present invention are important because the servo head can be placed in the center of the disk stack and still have the data head across from it. This permits the utilization of all data disk surfaces, which maximizes the data capacity of the disk drive. In addition, the mechanical and thermal drift tolerance stack-up between the outer data heads and the servo head is minimized, which improves track following accuracy. This also allows the possibility of inclusion of more disks in the disk stack, which again increases overall data capacity.

Although the present invention has been described with reference to preferred embodiments, workers skilled in the art will recognize that changes may be made in form and detail without departing from the spirit and scope of the invention.

What is claimed is:

1. A data storage system, comprising:

a spindle;

a first magnetic disk mounted on the spindle for storing information;

a second magnetic disk mounted on the spindle for storing information;

a first head, positioned between the first and second magnetic disks and adjacent the first magnetic disk, the first head including a first slider and a first transducer mounted on the first slider for writing information to the first magnetic disk; and a second head, positioned between the first and second magnetic disks and adjacent the second magnetic disk, for producing an output signal as a function of the information stored on the second magnetic disk, the second head including a second slider, a second transducer mounted on the second slider for reading the information stored on the second magnetic disk, and a third transducer mounted on the second slider non-coaxial with the second transducer, wherein the third transducer is so disposed and arranged with respect to the second transducer as to be positioned immediately adjacent to the second transducer so that the second and third transducers are connected to produce the output signal so noise signals induced in the second transducer by operation of the first transducer tend to be canceled by noise signals induced in the third transducer by operation of the first transducer, the immediately adjacent position of the third transducer relative to the second transducer being limited such that the second and third transducers are not in physical contact.

2. The data storage system of claim 1 wherein spacing between the second transducer and the first transducer is approximately equal to spacing between the third transducer and the first transducer.

3. The data storage transducer of claim 1 wherein the third transducer is a magnetic transducer having pole tips, the pole tips being oriented in a direction away from the second magnetic disk.

4. The data storage system of claim 1 wherein the first magnetic disk comprises:

a data disk for storing data.

5. The data storage system of claim 4 wherein the second magnetic disk comprises:

a servo disk for storing servo information.

6. The data storage system of claim 5 wherein the first transducer comprises:

a data transducer for writing data to the data disk.

7. The data storage system of claim 6 wherein the second transducer comprises:

a first servo transducer for reading the servo information stored on the servo disk.

8. The data storage system of claim 7 wherein the third transducer comprises:

a second servo transducer, wherein the first and second servo transducers are connected to produce the output signal as a function of the servo information stored on the servo disk.

9. The data storage system of claim 8 and further comprising:

a servo actuator for positioning the first head and the second head as a function of the output signal produced by the first and second servo transducers.

10. A data storage system, comprising:

a spindle;

a first magnetic disk mounted on the spindle for storing information;

a second magnetic disk mounted on the spindle for storing information a first head, positioned between the first and second magnetic disks and adjacent the first magnetic disk, the first head including a first slider and a first transducer mounted on the first slider for writing information onto the first magnetic disk; and a second head, positioned between the first and second magnetic disks and adjacent the second magnetic disk, for producing an output signal as a function of the information stored on the second magnetic disk, the second head including a second slider, a second transducer mounted on the second slider for reading information stored on the second magnetic disk, and a third transducer mounted on the second slider non-coaxial with the second transducer, the second and third transducers being spaced a distance from each other, the distance being less than a size of the transducers, the second and third transducers being coupled together to produce the output signal so that noise signals induced in the second transducer by operation of the first transducer tend to be canceled by noise signals induced in the third transducer by operation of the first transducer.

11. The data storage system of claim 10 wherein the second and third transducers are mounted on the slider immediately adjacent one another.

12. The data storage system of claim 11 wherein the third transducer is mounted on the slider in a position in which the third transducer is insensitive to information stored on the second magnetic disk.

13. The data storage system of claim 12 wherein the third transducer is a magnetic transducer having pole tips, and wherein the pole tips are oriented in a direction away from the second magnetic disk.

14. The data storage system of claim 13 wherein the first magnetic disk comprises:

a data disk for storing data.

15. The data storage system of claim 14 wherein the second magnetic disk comprises:

a servo disk for storing servo information.

16. The data storage system of claim 15 wherein the first transducer comprises:

a data transducer for writing data to the data disk.

17. The data storage system of claim 16 wherein the second transducer comprises:

a first servo transducer for reading the servo information stored on the servo disk.

18. The data storage system of claim 17 wherein the third transducer comprises:

a second servo transducer, wherein the first and second servo transducers are connected to produce the output signal as a function of the servo information stored on the servo disk.

19. The data storage system of claim 18 and further comprising:

a servo actuator for positioning the first head and the second head as a function of the output signal produced by the first and second servo transducers.

20. A data storage system comprising:

a spindle;

a data disk mounted on the spindle for storing data;

a servo disk mounted on the spindle for storing servo information; a data head positioned between the data disk and the servo disk and adjacent the data disk, the data head including a first slider and a data transducer mounted on the first slider for writing data onto the data disk;

a servo head, positioned between the data disk and the servo disk and adjacent the servo disk, for producing a servo output signal as a function of the servo information, the servo head including a second slider, a first servo transducer mounted on the second slider for reading the servo information stored on the servo disk and a second servo transducer mounted on the second slider non-coaxial with the first servo transducer in a position in which the second servo transducer is insensitive to the servo information stored on the servo disk, wherein the second servo transducer is a magnetic transducer having pole tips and where the pole tips are oriented in a direction away from the servo disk, the first and second servo transducers being located on the second slider immediately adjacent one another without being in physical contact with each other, the first and second servo transducers being connected to produce the servo output signal so that noise signals induced in the first servo transducer by operation of the data transducer tend to be canceled by noise signals induced in the second servo transducer by operation of the data transducer; and a servo actuator for positioning the data head and the servo head as a function of the servo output signal.

21. A data storage system, comprising:

a spindle;

a first magnetic disk mounted on the spindle for storing information;

a second magnetic disk mounted on the spindle for storing information;

a first head, positioned between the first and second magnetic disks and adjacent the first magnetic disk, the first head including a first slider and a first transducer mounted on the first slider for writing information to the first magnetic disk; and a second head, positioned between the first and second magnetic disks and adjacent the second magnetic disk, for producing an output signal as a function of the information stored on the second magnetic disk, the second head including a second slider, a second transducer mounted on the second slider for reading the information stored on the second magnetic disk, and a third transducer mounted on the second slider coplanar with the second transducer, wherein the third transducer is so disposed and arranged with respect to the second transducer as to be positioned immediately adjacent to the second transducer so that the second and third transducers are connected to produce the output signal so noise signals induced in the second transducer by operation of the first transducer tend to be canceled by noise signals induced in the third transducer by operation of the first transducer, the immediately adjacent position of the third transducer relative to the second transducer being limited such that the second and third transducers are not in physical contact.

22. A data storage system, comprising:

a spindle;

a first magnetic disk mounted on the spindle for storing information;

a second magnetic disk mounted on the spindle for storing information a first head, positioned between the first and second magnetic disks and adjacent the first magnetic disk, the first head including a first slider and a first transducer mounted on the first slider for writing information onto the first magnetic disk; and a second head, positioned between the first and second magnetic disks and adjacent the second magnetic disk, for producing an output signal as a function of the information stored on the second magnetic disk, the second head including a second slider, a second transducer mounted on the second slider for reading information stored on the second magnetic disk, and a third transducer mounted on the second slider coplanar with the second transducer, the second and third transducers being spaced a distance from each other, the distance being less than a size of the transducers, the second and third transducers being coupled together to produce the output signal so thin noise signals induced in the second transducer by operation of the first transducer tend to be canceled by noise signals induced in the third transducer by operation of the first transducer.

* * * * *

UNITED STATES PATENT AND TRADEMARK OFFICE
CERTIFICATE OF CORRECTION

PATENT NO. : 5,471,354

DATED : November 28, 1995

INVENTOR(S) : JOHN BORTINS; FRANK STAGEBERG; LANCE E. STOVER; GERALD L. WEISPFENNING

It is certified that error appears in the above-indentified patent and that said Letters Patent is hereby corrected as shown below:

Col. 1, line 14, after "noise", insert --cancellation--

Col. 1, line 32, after "When that data head", insert --is--

Col. 6, line 28, after "the disk surface, and", change X to $\lambda$

Signed and Sealed this

Fifth Day of March, 1996

Attest:

*Attesting Officer*

BRUCE LEHMAN

*Commissioner of Patents and Trademarks*